United States Patent
Dodd et al.

(10) Patent No.: US 6,795,899 B2
(45) Date of Patent: Sep. 21, 2004

(54) MEMORY SYSTEM WITH BURST LENGTH SHORTER THAN PREFETCH LENGTH

(75) Inventors: James M. Dodd, Shingle Springs, CA (US); Howard S. David, Portland, OR (US)

(73) Assignee: Intel Corporation, Santa Clara, CA (US)

(*) Notice: Subject to any disclaimer, the term of this patent is extended or adjusted under 35 U.S.C. 154(b) by 204 days.

(21) Appl. No.: 10/104,270

(22) Filed: Mar. 22, 2002

(65) Prior Publication Data

US 2003/0182513 A1 Sep. 25, 2003

(51) Int. Cl.[7] .............................................. G06F 12/00
(52) U.S. Cl. ........................ 711/137; 711/204; 712/207
(58) Field of Search ............................... 711/137, 204; 712/207; 365/222

(56) References Cited

U.S. PATENT DOCUMENTS

| | | | |
|---|---|---|---|
| 5,623,608 A | * | 4/1997 | Ng ............................. 711/137 |
| 6,012,106 A | | 1/2000 | Schumann et al. |
| 6,157,992 A | | 12/2000 | Sawada et al. |
| 6,233,656 B1 | * | 5/2001 | Jones et al. ................. 711/137 |
| 6,272,564 B1 | | 8/2001 | Garrett et al. |
| 6,301,183 B1 | * | 10/2001 | Bondurant et al. ......... 365/222 |
| 6,304,962 B1 | | 10/2001 | Nair |
| 6,405,286 B2 | | 6/2002 | Gupta et al. |
| 6,542,982 B2 | * | 4/2003 | Murakami et al. .......... 712/207 |

* cited by examiner

*Primary Examiner*—Mano Padmanabhan
*Assistant Examiner*—Thang Ho
(74) *Attorney, Agent, or Firm*—Alan K. Aldous (57) ABSTRACT

In some embodiments, the invention includes a system having a memory controller, a bus, and first and second memory devices. The memory controller requests read and write operations and operates with a burst length. The first and second memory devices are coupled to the memory controller through the bus, the first and second memory devices each having a prefetch length that is greater than the burst length, but performing the requested read and write operations with the burst length. Other embodiments are described and claimed.

35 Claims, 10 Drawing Sheets

MEMORY SYSTEM WITH BURST LENGTH SHORTER THAN PREFETCH LENGTH

BACKGROUND OF THE INVENTION

1. Technical Field of the Invention

The present invention relates to computer memory systems and, more particularly, to a computer memory system with a memory controller that can read or write chunks of data in burst lengths that are shorter than the prefetch length of the corresponding memory.

2. Background Art

Computer systems typically include memory devices from which data may be written to or read from. A commonly used memory device to store relatively large amount of data are dynamic random access memories (DRAMs). Examples of DRAMs include synchronous DRAMs (SDRAMs) and double data rate SDRAMs (DDR DRAMs). A specification for DDR-II DRAMs (a next generation of DDR DRAMs) is being finalized. Other synchronous DRAMs include Rambus RDRAMs. There are various types of memory other than DRAMs including static random access memories (SRAMs). Other types of memory are being developed.

Memory controllers issue write requests and read requests to DRAMs. The memory controller and DRAMs are coupled through a bus that carries write or read data. The data to be stored in response to a write request may originate from a processor or another chip. The data provided by the DRAM in response to a read request may be used by the processor or another chip. The memory controller may be in a physically separate chip from the processor or may be on the same chip as the processor.

A burst length is the number of chunks of data stored in the memory core or retrieved from the memory core in response to a write or read command and a corresponding starting address. Each of the chunks is associated with a full clock cycle in the case of SDRAM and a half clock cycle in the case of double data rate DRAMs, such as DDR and DDR II DRAMs. There are many parallel bits of data in each chunk. The DRAMs have a core prefetch length, which is the number of clock cycles (in the case of SDRAMs) or half cycles (in the case of DDR DRAMs) of data that is either written into or retrieved from the core by a single write or read operation. The term prefetch is used to reference both writing to a memory core and reading from the core.

SDRAM and DDR DRAMs have a controllable burst length and DDR-II DRAMs will have a controllable burst length. However, these memories do not have and are not expected to have controllable core prefetch lengths. SDRAMs have prefetch lengths of 1 clock cycle and allow burst lengths of 1, 2, and 4 clock cycles. Accordingly, if the burst length is 1, there is only one prefetch operation for each write or read command. If the burst length is 2, there are two prefetch operations for each write or read command. If the burst length is 4, there are four prefetch operations for each write or read command. DDR DRAMs have prefetch lengths of 2 half clock cycles and allow burst lengths of 2, 4, and 8 half clock cycles. Accordingly, if the burst length is 2, there is only one prefetch operation for each write or read command. If the burst length is 4, there are two prefetch operations for each write or read command. If the burst length is 8, there are four prefetch operations for each write or read command. DDR-II DRAMS will have burst lengths of 4 and 8 half clock cycles and prefetch lengths of 4 half clock cycles. Accordingly, if the burst length is 4, there is only one prefetch operation for each write or read command. If the burst length is 8, there are two prefetch operations for each write or read command.

It is expected that there will some day be a DRAM with a prefetch length of 8 (this may be a DDR-II DRAM, which currently does not exist). A problem will then occur when a DRAM with a prefetch length of 8 is used in connection with a memory controller that expects burst lengths of 4. The following disclosure presents solutions to this problem.

Memories devices have been used in an interleaved fashion through dynamically controlling output driver enables. A pin has been used to control the output enables of one memory versus another in an interleaved fashion. Memory devices have tri-stated drivers during a read operation or in masking data.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

The invention involves a computer system in which a memory controller can read or write chunks of data in burst lengths that are shorter than the prefetch length of the corresponding memory.

Figure 1:
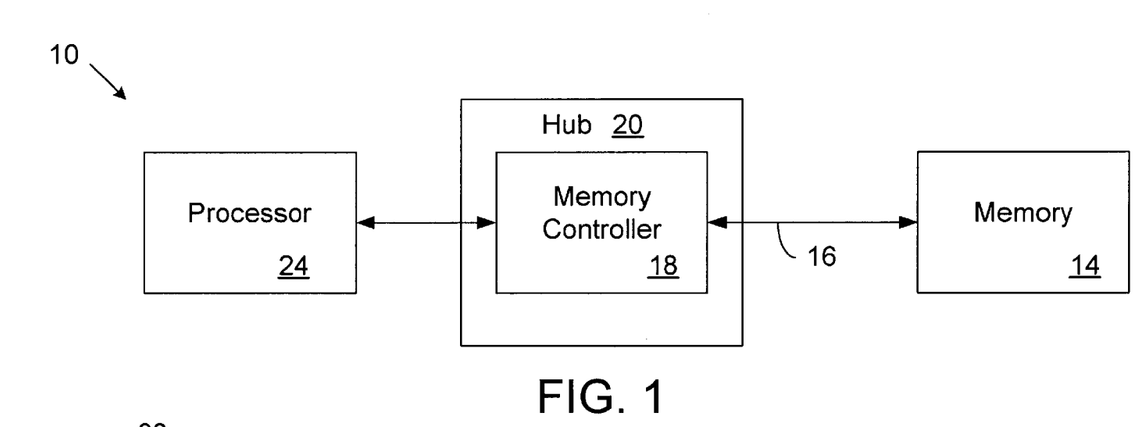
FIG. 1 is a block diagram representation of a computer system including a processor, a memory controller, and memory, according to some embodiments of the invention.

FIG. 1 illustrates a computer system 10 which includes memory 14. Memory 14 may represent a single memory device or a number of memory devices on one or more memory modules. The memory devices may be a DRAM such as one of the ones described above or some other sort of memory. A memory controller 18 provides data through bus 16 to memory 14 and receives data from memory 14 in response to read requests. Commands and/or addresses may be provided to memory 14 through conductors other than bus 16 or through bus 16. Controller 18 may receive data to be stored in memory 14 from a processor 24 or another chip. Controller 18 may provide the data it receives from memory 14 to processor 24 or another chips(s). Controller 18 is in a hub 20, which is sometimes called a memory controller hub or a north bridge in a chipset. Bus 18 can be a bi-directional bus or unidirectional bus. Bus 16 may include many parallel conductors. Bus 18 may be a multidrop bus, include one or more point to point conductors, or be some other type of bus. The signals may be differential or single ended. Although only one processor is shown, the invention may be employed in a multi-processor system.

Figure 2:
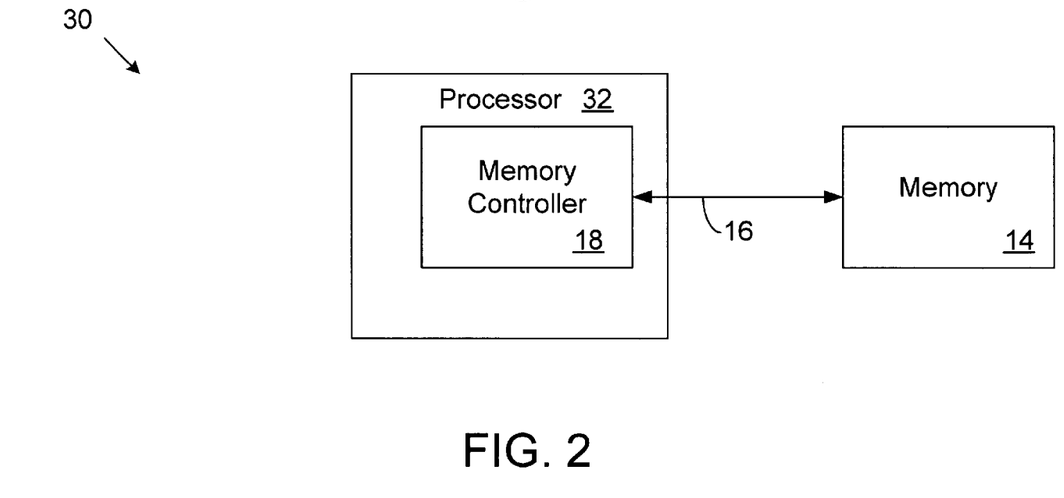
FIG. 2 is a block diagram representation of a computer system including a processor, a memory controller included in the processor, and memory, according to some embodiments of the invention.

FIG. 2 illustrates a computer system 30 which is similar to system 10, but in which the controller 18 is included in a processor 32.

Figure 3:
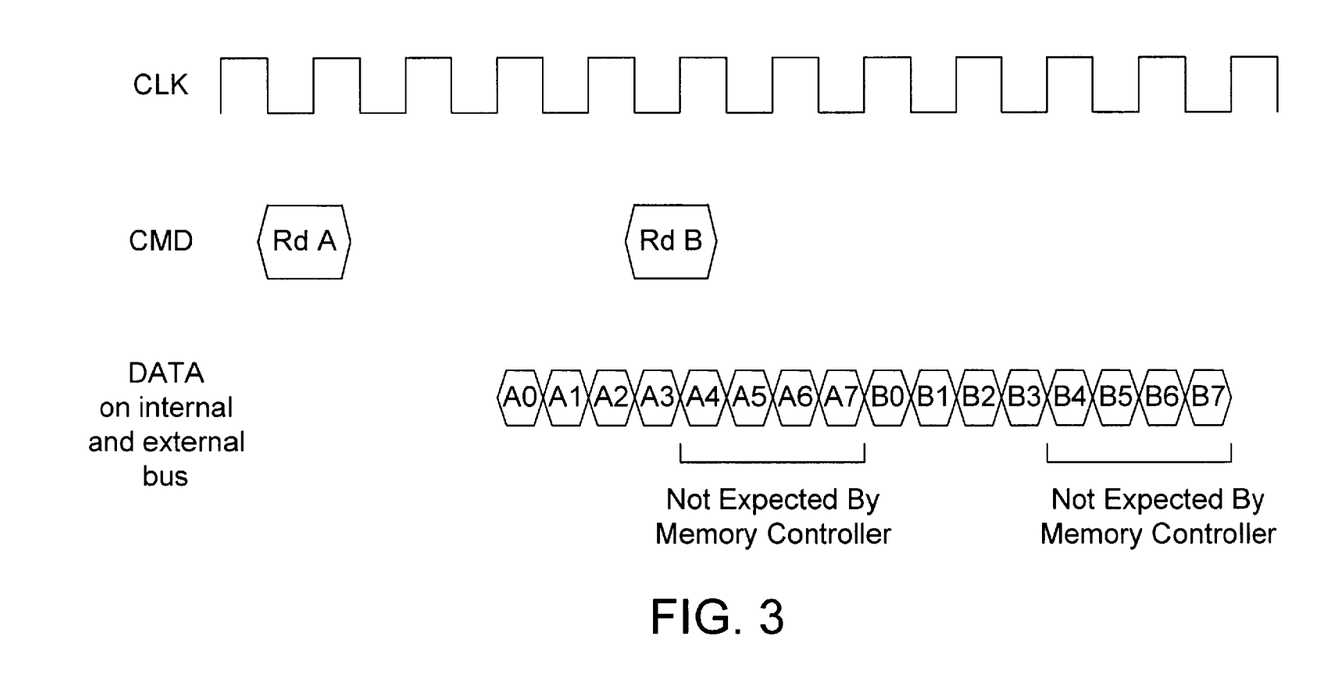
FIG. 3 is a timing diagram showing clock, read command, and DATA signals when the invention is not used.

FIG. 3 is a timing diagram showing what may happen without the present invention if a memory controller works with a burst length of 4 and memory has a prefetch length of 8. A read command Rd A requests data A. Some number of clock cycles later (the exact number is not important), eight chunks A0–A7 of data are prefetched from memory. The eight chunks of data A are driven onto an external bus, but only the first four chunks A0–A3 are used by the requesting memory controller. Likewise, only the first four of the eight chunks B0–B7 of data B are used by the requesting memory controller. This might lead to the memory controller ignoring chunks A4–A7 and B4–B7 or worse, it could lead to contention on the bus because the memory controller thinks the read request has already been completed, but data is still on the bus. At least half the bandwidth is lost in the approach of FIG. 3. In the case of a write command, the memory expects eight chunks, but receives only 4 chunks so half the memory might not be used effectively and there could be contention on the bus.

Figure 4:
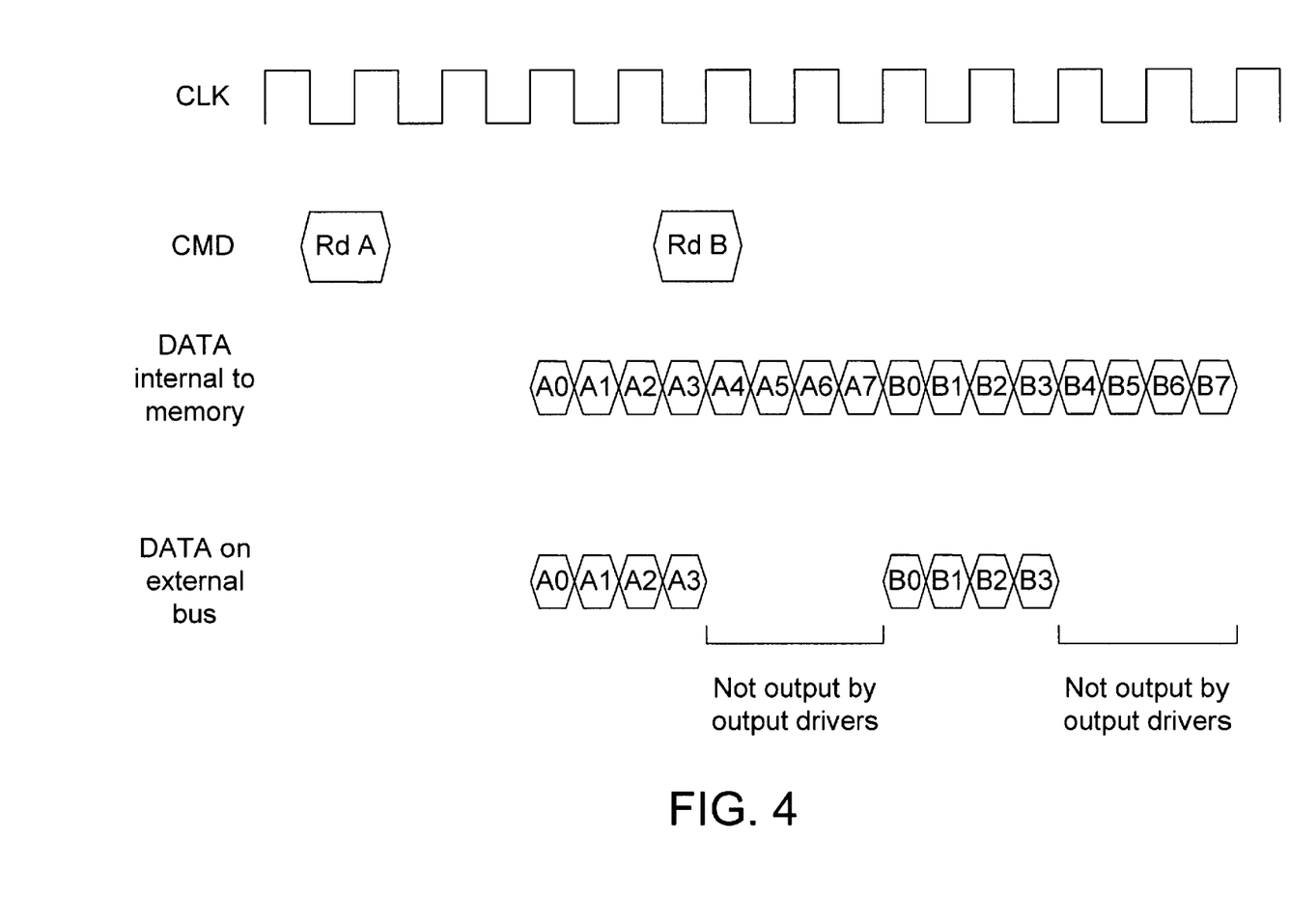
FIG. 4 is a timing diagram illustrating some aspects of some embodiments of the invention in connection with read operations.

The present invention involve techniques to allow a memory controller to operate with bursts lengths that are shorter than the memory's prefetch length. For read operations, this can be accomplished by disabling the memory device output drivers for those prefetched chunks that the memory controller does not expect to receive. For example, in FIG. 4, a timing diagram illustrates read commands Rd A and Rd B. Some number of half clock cycles after the Rd A command, the memory device prefetches data for chunks A0–A7. The "DATA internal to memory" section of FIG. 4 shows chunks entering the drivers. The drivers are enabled so that chunks A1–A4 are output onto the external bus, but disabled during the time chunks A4–A7 would have been output. The same is the case for chunks B0–B7 in response to read request Rd B. Note that in practice, there may be more clock cycles than are shown in the FIGS. 3, 4, 6, and 9 between the time of the read requests and time the chunks are prefetched. However, space limitations in the figures will not allow greater spacing between read requests and chunks being applied to the drivers.

Figure 5:
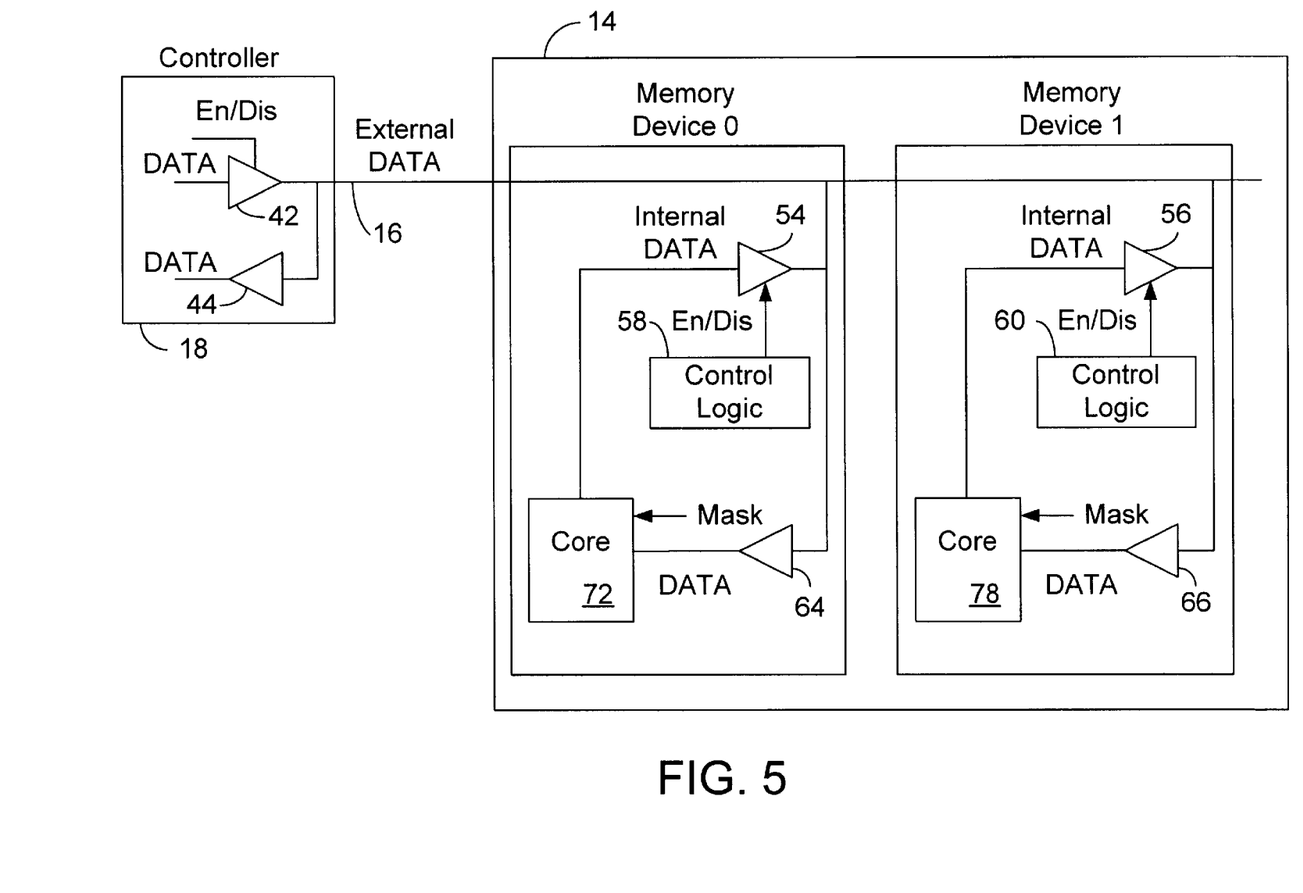
FIG. 5 is a block diagram representation of a system including a memory controller and two memory devices according to some embodiments of the invention.

By interleaving the output of memory devices each with an operation similar to that of FIG. 4, a great bandwidth utilization can be achieved. FIG. 5 shows one system for doing this, but the invention is not limited to the details of FIG. 5. Memory device 0 and memory device 1 are included in memory 14. Memory devices 0 and 1 may be in different ranks, but the invention is not limited to use with multiple ranks. Memory devices 0 and 1 may be on the same or different memory modules. Memory devices 0 and 1 may be in the same chip or in different chips. Memory 14 may include only devices 0 and 1 or may include additional memory devices.

Figure 6:
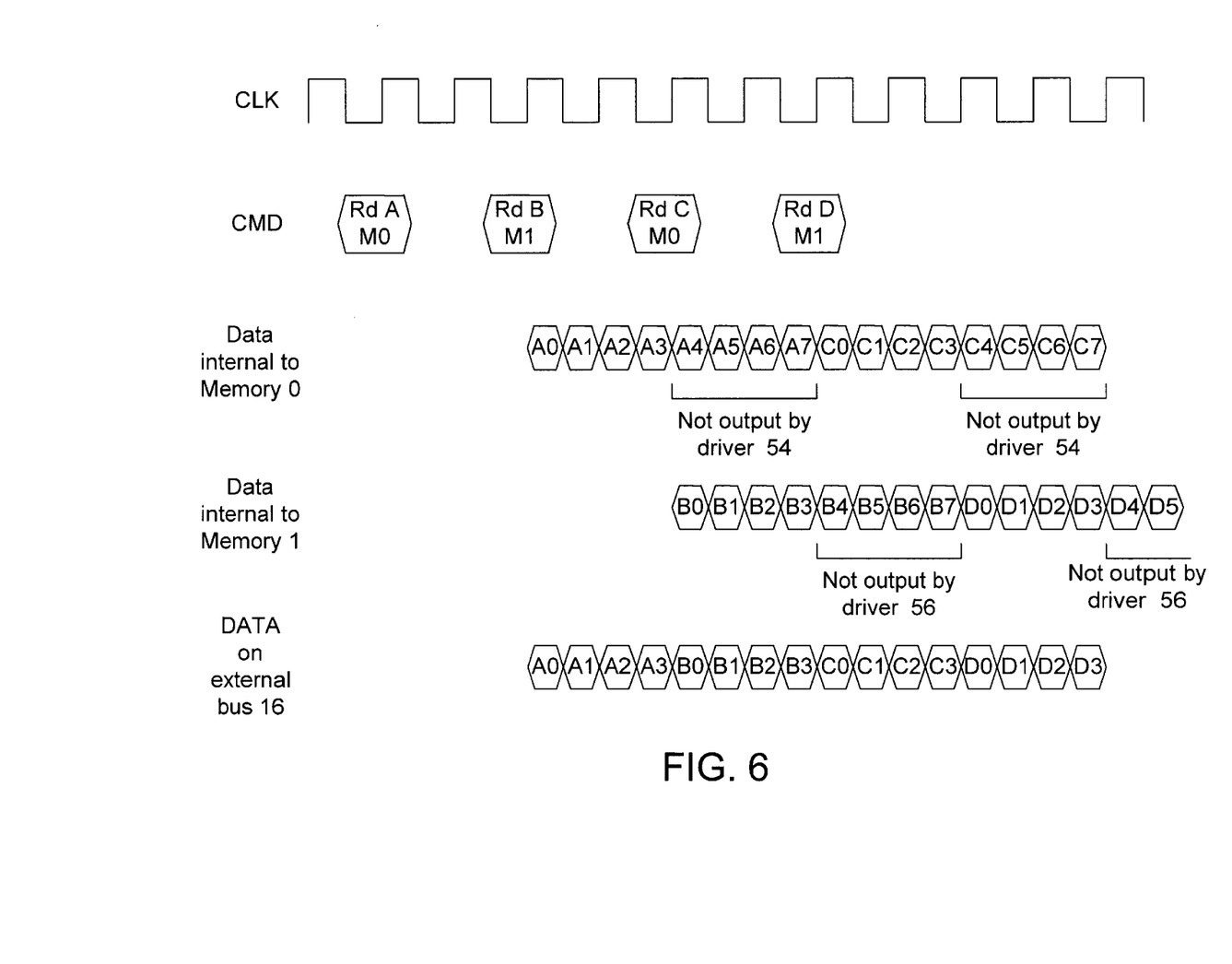
FIG. 6 is a timing diagram illustrating some aspects of some embodiments of the invention in connection with read operations.

The operation of the system of FIG. 5, can be explained with reference to the timing diagrams of FIGS. 6, 9, and 10. In FIG. 6, CLK is the clock signal, CMD represents commands provided by controller 18 to memory 14; "DATA internal to Memory 0" are data chunks provided to output drivers 54 and "DATA internal to Memory 1" are data chunks provided to output drivers 56; and "DATA on external bus 16" is the data output from drivers 54 and 56. In FIG. 6, read commands Rd A and Rd C are provided to memory device 0 and read commands Rd B and Rd D are provided to memory device 1. Sometime after the Rd A command is received, data A is prefetched in a prefetch length of 8 by core 72 of memory device 1 and provided as data chunks A0–A7 to drivers 54. (As noted, the number of half cycles of CLK between the read command and the data chunks may be greater than shown in FIG. 6.)

Control logic 58 enables drivers 54 to output chunks A1–A4, but disables drivers 54 during the time A4–A7 are provided to drivers 54. Accordingly, only chunks A0–A3 are output to bus 16. Sometime after the Rd B command is received, data B is prefetched in a prefetch length of 8 by core 78 of memory device 1 and provided as data chunks B0–B7 to drivers 56. Control logic 60 enables drivers 56 to output chunks B0–B3, but disables drivers 56 during the time B4–B7 are provided to drivers 56. Accordingly, only chunks B0–B3 are output to bus 16. Likewise, in response to read requests Rd C, data C is prefetched in a prefetch length of 8 by core 72 and provided as data chunks C0–C7 to drivers 54 which are enabled to output chunks C0–C3, but not C4–C7. In response to read requests Rd D, data D is prefetched in a burst length of 8 by core 78 and provided as data chunks D0–D7 to drivers 56 which are enabled to output chunks D0–D3, but not D4–D7. As can be seen in FIG. 6, only chunks A0–A3, B0–B3, C0–C3, and D0–D3 are output on bus 16 in an interleaved fashion, which is what is expected by controller 18.

In some embodiments, an address bit such as A2 in the case of prefetch of 8 can be used to select whether the chunks are read from or written to the lower or upper portion of memory core that holds eight chunks worth of data. In this way, the entire core can be utilized even though the burst length is less than the prefetch length. Of course, the invention is not limited to use of either a prefetch length of 8 or burst length of 4. Further, memory 14 can be used with controllers having a burst length the same as its prefetch length.

Figure 7:
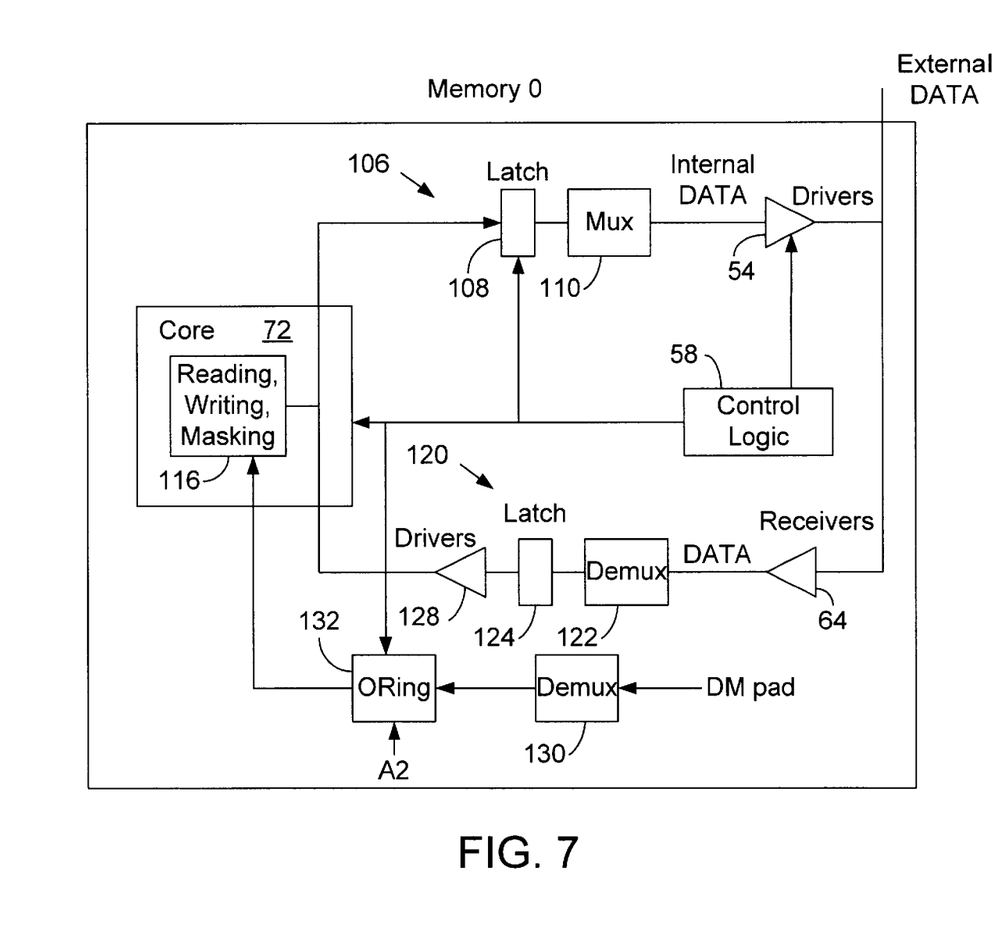
FIG. 7 is a block diagram representation of additional detail of memory devices according to some embodiments of the invention.

FIG. 7 shows additional details that may be used in some embodiments of the invention, but the invention is not limited to these details. Delivering circuitry 106 delivers at least some of the data from core 72 to drivers 54. In some embodiments, circuitry 106 includes a latch 108 and a multiplexer (Mux) 110, although the invention is not limited to this. Core 72 may prefetch the bits for the chunks in parallel. Merely as an example, in a X8 device, core 72 might prefetch 64 bits (72 bits with error correction code (ECC)) that are received by latch 108 and multiplexed by multiplexer 110 into 8 chunks each that are 8 bits wide and one half clock cycle in duration. If chunks A0–A7 are provided by multiplexer 110 to drivers 54, it may still be said chunks A0–A7 are prefetched by core 72. Other components of FIG. 7 will be discussed in connection with FIG. 10. Of course, the invention is not limited to X8 devices, prefetching a particular width of data, or latching or multiplexing as shown in FIG. 7.

Figure 8:
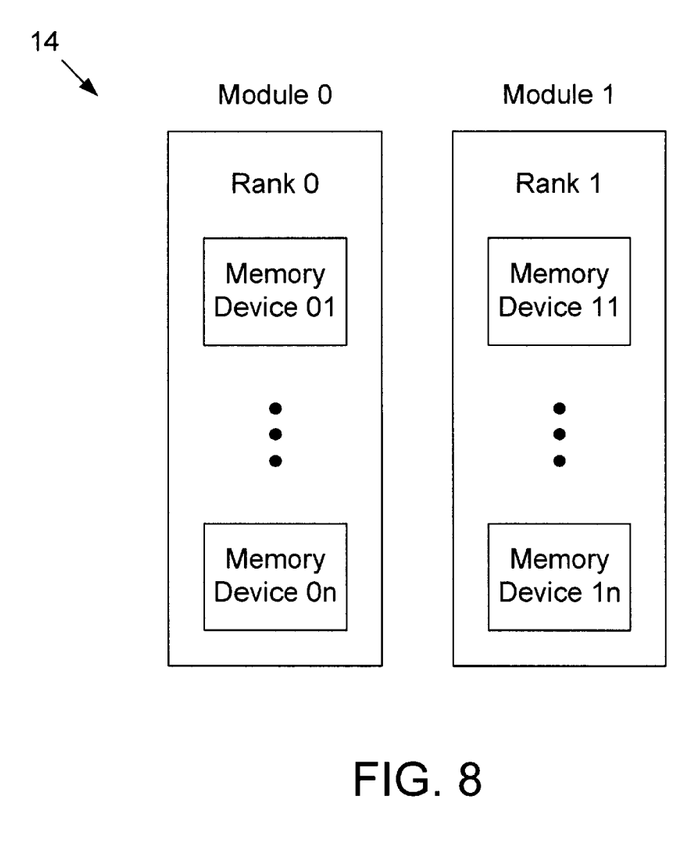
FIG. 8 is a block diagram representation of multiple memory devices that may be operated as a group in interleaved memory operations according to some embodiments of the invention.

As mentioned, devices 0 and 1 might not be the only devices in memory 14. For example, as shown in FIG. 8, a rank 0 includes devices 01 . . . 0n and a rank 1 includes devices 11 . . . 1n. In some embodiments, each device in a rank responds to a read request and provides some of the data to bus 16 or a write request and stores part of the data on the bus, although the invention is not limited to this arrangement. Rank 0 is shown in a memory module 0 and rank 1 is shown in a memory module 1, but that is not required. Ranks 0 and 1 could be on the same module. There may be additional ranks and modules, or additional modules but only two ranks, or additional ranks, but only two modules.

In some memories, there is a turn-around delay between two memory devices. The turn-around delay is a specific amount of time required between when one memory device tri-states its output drivers and another device begins to drive its outputs on the bus. The turn-around may be protocol specific. FIG. 9 is a timing diagram that is very similar to FIG. 6, however in FIG. 9 the turn-around time is involved. In FIG. 9, there is a delay (e.g., two clock half cycles) between the time drivers 54 stop driving chunk A3 and when drivers 56 start driving chunk B0. Further there is a delay between the time drivers 56 stop driving chunk B3 and the time drivers 54 start driving chunk C0, and between the time drivers 54 stops driving chunk C3 and drivers 56 start driving chunk D0. These delays are reflected in the "DATA on external bus 16" line of the timing diagram.

Figure 9:
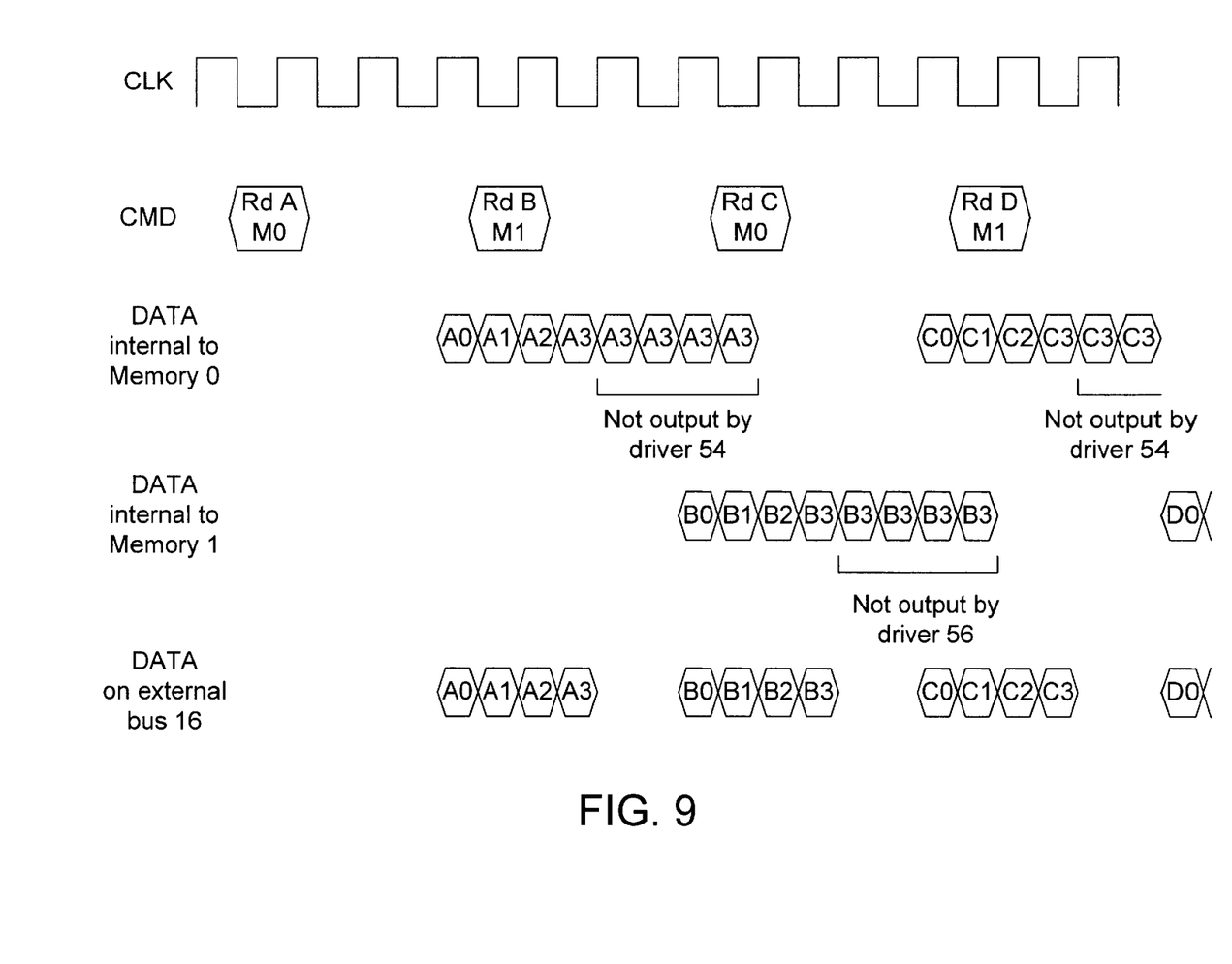
FIG. 9 is a timing diagram illustrating some aspects of some embodiments of the invention in connection with read operations.

In FIG. 9, the chunks of data A and data C that are not output by drivers 54 are shown as A3, A3, A3, and A3 and C3, C3, C3, and C3, respectively. Likewise, the chunks of data B and data D are that not output by drivers 56 are shown as B3, B3, B3, and B3 and D3, D3, D3, and D3, respectively. This is in contrast to in FIG. 6 in which the chunks not driven by drivers 56 are chunks A4–A7 and C4–C7 and not driven by drivers 56 are chunks B4–B7 and D4–D7. An advantage of repeatedly providing the same chunk to drivers 54 and 56 is that it may reduce ringing and power consumption. However, in FIG. 9, the chunks provided to drivers 54 and 56 when they are disabled could have been the same as in FIG. 6, and in FIG. 6, the chunks provided to drivers 54 and 56 when they are disabled could have been the same as in FIG. 9. That is, whether or not the turn-around time is involved, the same chunks (e.g., A3, A3, A3, A3, A3) may or may not be repeatedly provided. Still alternatively, to further reduce power, the core could not provided anything for those chunks that will not be output. Although there are gaps between on bus 16 between chunks A0–A3, B0–B3, C0–C3, and D0–D3, the read data chunks from different memories may be said to be interleaved on bus 16.

Figure 10:
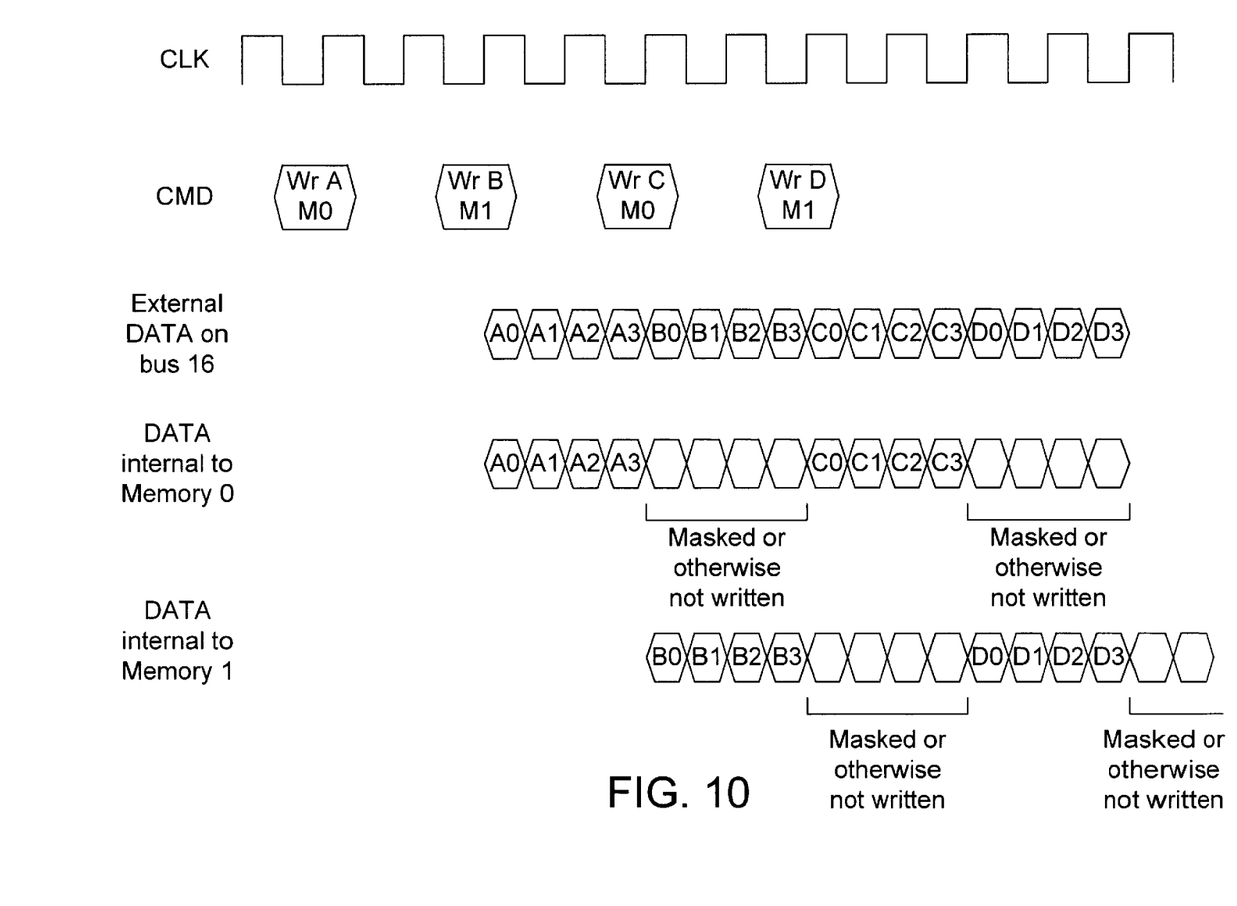
FIG. 10 is a timing diagram illustrating some aspects of some embodiments of the invention in connection with write operations.

FIG. 10 illustrates write commands performed by the embodiments of FIG. 5. Controller 18 provides write commands Wr A and Wr C to memory device 0 to request that it writes (stores) data A and data C. Controller 18 provides write commands Wr B and Wr D to memory device 1 to request that it writes data B and data D. Data A, B, C, and D each include four chunks of one half cycle length (A0–A3, B0–B3, C0–C3, D0–D3). Write data on bus 16 is interleaved in that it is intended for alternating different devices. Data A and C are provided on bus 16 to memory device 0 and data B and C are provided on bus 16 to memory device 1. There may also be additional bits in parallel with these chunks intended for other memory devices (e.g., see FIG. 8). Sometime after the Wr A command is issued, chunks A0–A3 are received by receivers 64 of memory device 0. Core 72 expects eight chunks worth of data to write (store) into the core. The data for chunks A0–A3 is written in core 72, but the data that would be written for the last four chunks (which are not received from bus 16) is masked, so that nothing is stored for those chunks. (As noted, an address bit, e.g., bit A2, can control whether the four chunks A0–A3 are written into the lower or upper half of the portion from which eight chunks are prefetched.)

Sometime after the Wr B command is issued, chunks B0–B3 are received by receivers 66 of memory device 1. The data for chunks B0–B3 is written in core 78, but the data that would have been written for the last four chunks (which are not received from bus 16) is masked, so that nothing is stored for those chunks. In similar fashion, chunks C0–C3 and D0–D3 are written into cores 72 and 78, respectively. In some embodiments, there may be gaps on bus 16 between data A and data B, data B and data C, data C and data D.

FIG. 7 shows additional details that may be used in some embodiments of the invention, but the invention is not limited to these details. Delivering circuitry 120 delivers at least some of the data from receivers 64 to core 72. In some embodiments, circuitry 120 includes demultiplexer 122 which takes the DATA signal (e.g., A0–A3) received by receivers 64 and converts them to a wider signal which is received by a latch 124. The output of latched 128 is driven by drivers 128 to reading, writing, and masking circuitry 116 in core 72. Note that the paths from drivers 128 and to latch 108 do not have to merge outside reading, writing, and masking circuitry 116. Rather, these could be completely separate paths. Demultiplexer 130 receives a masking signal which may be serial data masking signal from controller 18 received through a data masking (DM or DQM) pad, or may be received through some other mechanism. Demultiplexer 130 may convert this serial data masking signal to a parallel data masking signal which is applied to logical ORing circuitry 132. Logical ORing circuitry 132 changes whether the bottom or top portion of the memory is to be masked depending on the state of an address bit (e.g., A2 in the case of a prefetch of 8). Data masking may be performed automatically under the control of control logic 58, rather than through an external data masking pad and associated masking signals. In these embodiments, the data mask signals through the DM pad can indicate whether any of the bytes in the chunks actually received need to be masked.

Control logic 58 can control one or more of the following: whether drivers 54 are enabled or disabled, whether latch 108 provides the same chunk repeatedly (e.g., A0–A8 or A0, A1, A2, A3, A3, A3, A3, and A3), whether ORing circuitry 132 provides the masking signals, whether core 72 provides all the chunks in response to a read or only part of them.

Figure 11:
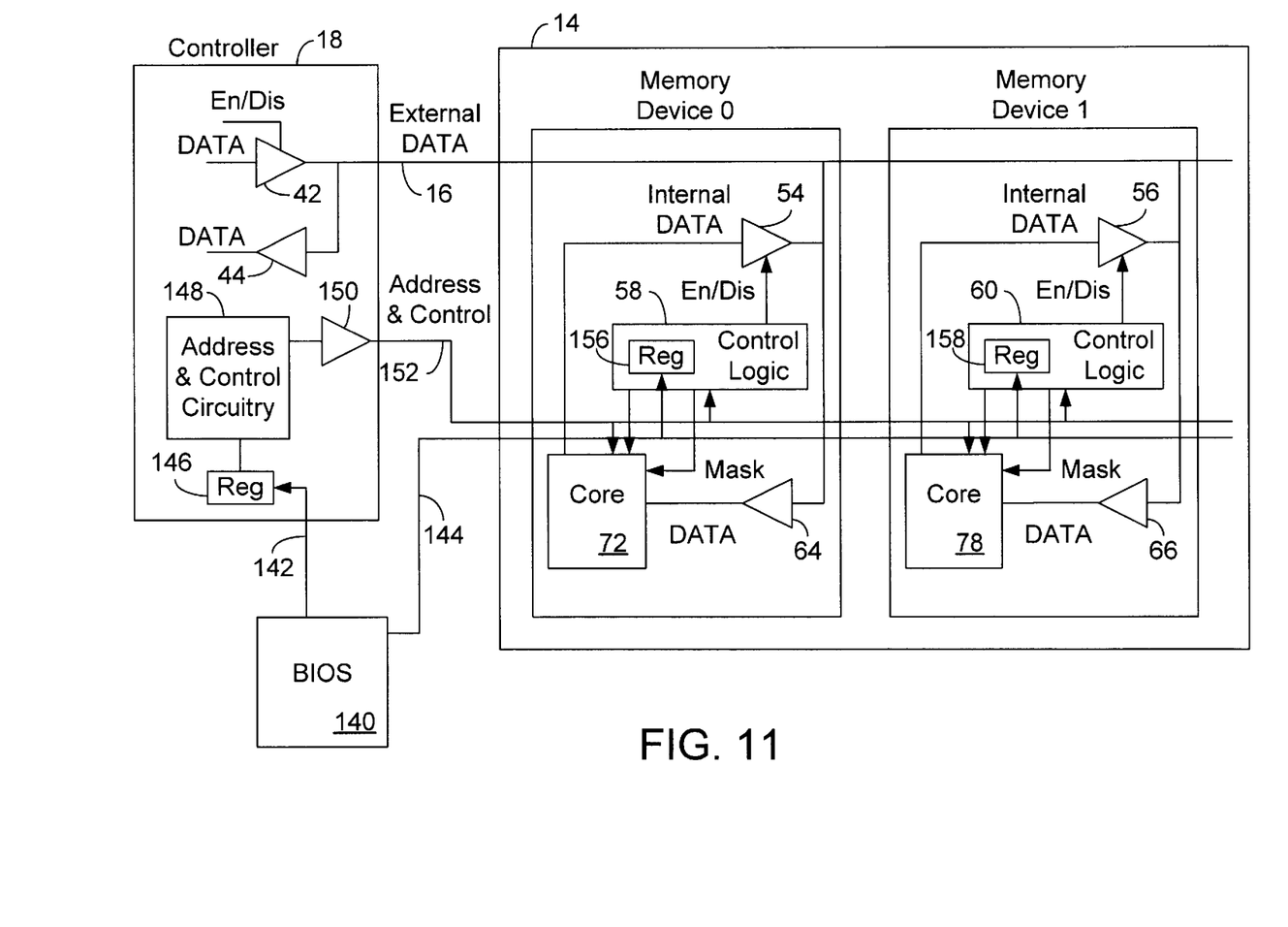
FIG. 11 is a block diagram representation of a system including a memory controller, two memory devices, and BIOS, according to some embodiments of the invention.

FIG. 11 shows additional details that may be used in some embodiments of the invention, but the invention is not limited to these details. In some embodiments, control logic 58 includes a register 156 and control logic 60 includes a register 158. Registers 156 and 158 indicate, perhaps among other things, whether memory devices 0 and 1 are in a mode in which the burst length and prefetch lengths are the same or in a mode in which they are different. If only one bit is used for this purpose in each of registers 156 and 158, then one state of that bit could indicate controller 18 has a burst length of 4 and the other state could indicate a burst length of 8, or other values if applicable. In some embodiments, there might be a register 146 in controller 18 indicating the prefetch length of memory devices 0 and 1, but that is not necessary. Register 146 might be used to indicate whether controller 18 can be used with devices 0 and 1 at all or register 146 might be used to change the internal operation of controller 18 so that it can interface effectively with memory devices 0 and 1. In some embodiments, controller 18 works with only one memory prefetch length and in other embodiments, controller 18 can adapt to work with different memory prefetch lengths.

Note that registers 146, 156, and 158 do not have to have a number which is the same as the burst or prefetch length. Rather, the value in the registers may indicate the burst or prefetch lengths indirectly by causing controller 18 or memory devices 0 and 1 to act consistent with the prefetch and burst lengths. The setting of registers 146, 156, and 158 may be done through BIOS 140 (basic input output system) through conductor(s) 142 and 144. Conductors 142 and 144 may also be used for other purposes. BIOS 140 could detect the burst length of controller 18 and prefetch length of memory devices 0 and 1 at, for example, boot up. BIOS 140 represents hardware and firmware or software. Registers 156 and 158 could be controlled through controllers 18. The system might have registers 156 and 158 and not register 146 or it might include register 146 and not registers 156 and 158, or it could include registers 146, 156, and 158. The burst length of controller 18 can be indicated through some mechanism other than registers 156 and 158. It is not necessary that the burst length be variable, but it allows the system to be more versatile.

In some embodiments, the read and writes could be in different burst lengths. For example, writes could be in a burst length of 8 and reads could be in a burst length of 4 (or vice versa) with prefetch lengths being 8. In that case, half the written data would not be automatically masked. As another example, reads could be in a burst length of 4, writes could be in burst length of 8, and the prefetch length 16. These could be indicated in registers 156 and 158.

The operation of controller 18 may vary depending on its burst length and the prefetch length of memory devices 0 and 1. As illustrated in FIGS. 6, 9, and 10, in the case of a burst length of 4 and prefetch of 8, there are substantial gaps between data to or from the same memory device because of the difference in the length of 4 and length of 8. The bus is kept relatively full by interleaving the memory device operations. In the case of a burst of 4 and prefetch of 4, controller 18 may make back to back commands to the same memory device. However, there may be gaps for back to back commands even in the burst of 4 and prefetch of 4 situation. The state of the device select signal relative to read and write commands and the spacing and order of the read and write commands might change depending on the burst and prefetch lengths.

Address and/or control signals may be provided through bus 16 or through conductors 152. Read, write, and masking signals are examples of control signals. Address and control signals may be generated in address and control circuitry 148 and provided through drivers 150. Device select signals may also be considered control signals and may be carried on conductors 152. Device select is optional and may be accomplished through other means. The entire rank of devices may be selected with a single device select signal. In this way, controller 18 may control interleaving of devices as described. Other ways may be used to control interleaving of devices.

In FIGS. 4, 6, 9, and 10, the chunks internal to the memory devices and chunks on bus 16 are shown as being lined up with each other. In practice, they might be out of alignment by one half clock cycle or more.

The figures are intended to be simplified representations. There may be additional structure (e.g., latches, buffers, control circuitry and other circuitry) between illustrated components on, for example, illustrated conductors.

In some embodiments, the processor, memory controller, and memory may be stacked on each other. For example, the chip(s) of memory 14 could be stacked on controller 18, which could be stacked on processor 24. In the case of a stacked system, hub 20 might not be used. Also, in some stacked embodiments, the memory controller is in the processor.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The invention is not restricted to the particular details listed herein. Indeed, those skilled in the art having the benefit of this disclosure will appreciate that many other variations from the foregoing description and drawings may be made within the scope of the present invention. Accordingly, it is the following claims including any amendments thereto that define the scope of the invention.

What is claimed is:

1. A system comprising:
   a memory controller to request read and write operations and operating with a burst length;
   a bus; and
   first and second memory devices coupled to the memory controller through the bus, the first and second memory devices each having a prefetch length that is greater than the burst length, but performing the requested read and write operations with the burst length.

2. The system of claim 1, wherein first and second memory devices each include:
   a core to prefetch data for the read operations for a number of chunks equal to the prefetch length;
   output drivers coupled to the bus to output some of the chunks of the prefetched data for the read operations;
   delivering circuitry to provide at least some of the prefetched data from the core to the output drivers;
   control logic to enable the output drivers to output a number of the chunks of the prefetched data equal to the burst length and otherwise disable the output drivers.

3. The system of claim 2, wherein the delivering circuitry delivers all the data prefetched from the core for the read operations.

4. The system of claim 2, wherein the delivering circuitry delivers only part of the data prefetched from the core for the read operations.

5. The system of claim 2, wherein the enabling of the control logic is selective depending on the mode of the first and second memory devices and wherein in one mode, the first and second memory devices operate as if burst length is less than the prefetch length and in another mode the first and second memory devices operate as if the burst length is equal to the prefetch length.

6. The system of claim 5, further comprising BIOS and wherein the mode is controlled by a register included in the control logic and the register is controlled by the BIOS.

7. The system of claim 1, wherein first and second memory devices each include:
   receivers coupled to the bus to receive chunks of data for the write operations;
   delivery circuitry to provide the received chunks from the receivers to be written in the core, wherein the core includes masking circuitry to mask data from being written adjacent to the received chunks.

8. The system of claim 7, wherein the masking of the data is selective, and wherein the first and second memory devices include control logic which controls whether the masking of the data occurs depending on a mode of the first and second memory devices and wherein in one mode, the first and second memory devices operate as if burst length is less than the prefetch length and in another mode the first and second memory devices operate as if the burst length is equal to the prefetch length.

9. The system of claim 8, further comprising BIOS and wherein the mode is controlled by a register included in the control logic and the register is controlled by the BIOS.

10. The system of claim 1, wherein the burst length is one half prefetch length, and wherein the first and second memory devices provide read data in an interleaved fashion.

11. The system of claim 1, wherein the first and second memory devices may be in different modes, wherein in one of the modes, the first and second memory devices operate as if the memory controller operates with a burst length less than the prefetch length and in another of the modes, the first and second memory devices operate as if the memory controller operates with a burst length equal to the prefetch length.

12. The system of claim 11, further comprising BIOS to control which mode the first and second memory devices are in.

13. The system of claim 1, wherein there is a gap between the last chunk of read data output by the first memory device and the first chunk read data output by the second memory device.

14. The system of claim 13, wherein the gap is used because of turn-around time.

15. The system of claim 1, further comprising additional memory devices and wherein the first and second memory devices are in different ranks in different modules.

16. A memory device comprising:
   a core to prefetch data for read operations for a number of chunks equal to a prefetch length;
   output drivers to output some of the chunks of the prefetched data for the read operations;
   first delivering circuitry to provide at least some of the prefetched data from the core to the output drivers;
   control logic to enable the output drivers to output a number of the chunks of the prefetched data equal to the burst length and disable the output drivers for additional chucks of the prefetched data when the burst length is less than the prefetch length.

17. The memory device of claim 16, wherein the delivering circuitry delivers all the data prefetched from the core for the read operations.

18. The memory device of claim 16, wherein the delivering circuitry delivers only part of the data prefetched from the core for the read operations.

19. The memory device of claim 16, wherein the enabling of the control logic is selective depending on the mode of the memory device and wherein in one mode, the memory device operates as if burst length is less than the prefetch length and in another mode the memory device operates as if the burst length is equal to the prefetch length.

20. The memory device of claim 19, wherein the mode is controlled by a register included in the control logic.

21. The memory device of claim 16, wherein memory device includes:
   receivers coupled to a bus to receive chunks of data for write operations;
   second delivery circuitry to provide the received chunks from the receivers to be written in the core, wherein the core includes masking circuitry to mask data from being written adjacent to the received chunks.

22. The memory device of claim 21, wherein the masking of the data is selective, and wherein the first and second memory devices include control logic which controls whether the masking of the data occurs depending on a mode of the memory device and wherein in one mode, the memory device operates as if burst length is less than the prefetch length and in another mode the memory device operates as if the burst length is equal to the prefetch length.

23. A system comprising:
   a memory controller to request read and write operations and operating with a read operations in a first burst length and write operations in a second burst length; and
   first and second memory devices coupled to the memory controller, the first and second memory devices each having a prefetch length and performing the requested read operations with the first burst length and the requested write operations with the second burst length, wherein one of the first or second burst lengths is less than the prefetch length and the other of the first and second burst lengths is less than or equal to the prefetch length, and wherein the first and second burst lengths are not equal.

24. The system of claim 23, wherein the first burst length is 4, the second burst length is 8, and the prefetch length is 8.

25. The system of claim 32, wherein the first burst length is 4, the second burst length is 8, and the prefetch length is 16.

26. The system of claim 23, wherein first and second memory devices each include:
   a bus to couple the memory controllers and the first and second memory devices;
   a core to prefetch data for the read operations for a number of chunks equal to the prefetch length;
   output drivers coupled to the bus to output some of the chunks of the prefetched data for the read operations;
   delivering circuitry to provide at least some of the prefetched data from the core to the output drivers;
   control logic to enable the output drivers to output a number of the chunks of the prefetched data equal to the first burst length and otherwise disable the output drivers.

27. The system of claim 26, wherein the enabling of the control logic is selective depending on the mode of the first and second memory devices and wherein in one mode, the first and second memory devices operate as if first burst length is less than the prefetch length and in another mode the first and second memory devices operate as if the first burst length is equal to the prefetch length.

28. The system of claim 26, further comprising BIOS and wherein the mode is controlled by a register included in the control logic and the register is controlled by the BIOS.

29. The system of claim 23, wherein first and second memory devices each include:

receivers coupled to the bus to receive chunks of data for the write operations;

delivery circuitry to provide the received chunks from the receivers to be written in the core, wherein the core includes masking circuitry to mask data from being written adjacent to the received chunks.

30. The system of claim 29, wherein the masking of the data is selective, and wherein the first and second memory devices include control logic which controls whether the masking of the data occurs depending on a mode of the first and second memory devices and wherein in one mode, the first and second memory devices operate as if first burst length is less than the prefetch length and in another mode the first and second memory devices operate as if the first burst length is equal to the prefetch length.

31. The system of claim 23, further comprising BIOS and wherein the mode is controlled by a register included in the control logic and the register is controlled by the BIOS.

32. The system of claim 23, wherein the first burst length is one half prefetch length, and wherein the first and second memory devices provide read data in an interleaved fashion.

33. The system of claim 23, wherein the first and second memory devices may be in different modes, wherein in one of the modes, the first and second memory devices operate as if the memory controller operates with a first burst length less than the prefetch length and in another of the modes, the first and second memory devices operate as if the memory controller operates with a first burst length equal to the prefetch length.

34. The system of claim 33, further comprising BIOS to control which mode the first and second memory devices are in.

35. The system of claim 23, further comprising additional memory devices and wherein the first and second memory devices are in different ranks in different modules.

* * * * *

UNITED STATES PATENT AND TRADEMARK OFFICE
CERTIFICATE OF CORRECTION

PATENT NO. : 6,795,899 B2
APPLICATION NO. : 10/104270
DATED : September 21, 2004
INVENTOR(S) : Dodd et al.

It is certified that error appears in the above-identified patent and that said Letters Patent is hereby corrected as shown below:

In the Claims

Claim 1, Column 8, at line 37 after, -- read -- delete "and write".

Claim 1, Column 8, at line 41 delete, "the first and second memory devices each having a prefetch length that is greater than the burst length, but performing the requested read and write operations with the burst length" and insert -- wherein the first and second memory devices each include: a core to prefetch data for the read operations for a number of chunks equal to the prefetch length; output drivers coupled to the bus to output some of the chunks of the prefetched data for the read operations; delivering circuitry to provide at least some of the prefetched data from the core to the output drivers; and wherein the output drivers output only a number of chunks of the prefetched data equal to the burst length in performing the read options --.

Claim 2, Column 8, at line 45 after, -- wherein -- insert -- the --.

Claim 2, Column 8, at line 47 delete, "a core to prefetch data for the read operations for a number of chunks equal to the prefetch length; output drivers coupled to the bus to output some of the chunks of the prefetched data for the read operations; delivering circuitry to provide at least some of the prefetched data from the core to the output drivers;".

Claim 7, Column 9, at line 8 after, -- wherein -- insert -- the memory controller requests write operations and operates with the burst length, and wherein the --.

Claim 16, Column 9, at line 61 delete, "chucks" insert -- chunks --.

Claim 22, Column 10, at line 39 delete, "equal." insert -- equal, and wherein the first and second memory devices each include: a core to prefetch data for the read operations for a number of chunks equal to the prefetch length; output drivers to output some of the chunks of the prefetched data for the read operations; delivering circuitry to provide at least some of the prefetched data from the core to the Signed and Sealed this
Twenty-fourth Day of December, 2013

Margaret A. Focarino
*Commissioner for Patents of the United States Patent and Trademark Office*

CERTIFICATE OF CORRECTION (continued)
U.S. Pat. No. 6,795,899 B2 output drivers; and wherein the output drivers output only a number of chunks of the prefetched data equal to the first burst length in performing the read operations. --.

Claim 26, Column 10, at line 46 after, -- wherein -- insert -- the --.

Claim 26, Column 10, at line 48 delete, "a bus to couple the memory controllers and the first and second memory devices; a core to prefetch data for the read operations for a number of chunks equal to the prefetch length; output drivers coupled to the bus to output some of the chunks of the prefetched data for the read operations; delivering circuitry to provide at least some of the prefetched data from the core to the output drivers;".

Claim 29, Column 11, at line 4 after, -- wherein -- insert -- the --.

Claim 29, Column 11, at line 6 after, -- coupled -- delete "to the bus".

Claim 29, Column 11, at line 7 after, -- operations; -- insert -- and --.